United States Patent [19]

Richman

[11] Patent Number: 5,801,356

[45] Date of Patent: Sep. 1, 1998

[54] LASER SCRIBING ON GLASS USING ND:YAG LASER

[75] Inventor: John A. Richman, Oceanside, Calif.

[73] Assignee: Santa Barbara Research Center, Goleta, Calif.

[21] Appl. No.: 515,721

[22] Filed: Aug. 16, 1995

[51] Int. Cl.⁶ .................................................. B23K 26/18
[52] U.S. Cl. ............................ 219/121.68; 219/121.69
[58] Field of Search ........................ 427/554, 556, 427/555; 219/121.68, 121.69; 65/30.11; 252/518

[56] References Cited

U.S. PATENT DOCUMENTS

| | | | |
|---|---|---|---|
| 4,535,218 | 8/1985 | Krause et al. | 219/121.68 |
| 4,716,270 | 12/1987 | Gnanamuthu et al. | 219/121.85 |
| 4,847,138 | 7/1989 | Boylan et al. | 65/30.11 |
| 5,027,132 | 6/1991 | Manns et al. | 346/108 |
| 5,266,771 | 11/1993 | Van Wyk | 219/121.69 |
| 5,298,717 | 3/1994 | DeRossett, Jr. | 219/121.68 |
| 5,378,508 | 1/1995 | Castro et al. | 427/556 |
| 5,382,485 | 1/1995 | Mizuguchi et al. | 430/21 |
| 5,393,465 | 2/1995 | Drozdyk et al. | 252/518 |

FOREIGN PATENT DOCUMENTS

| | | | |
|---|---|---|---|
| 459461 | 12/1991 | European Pat. Off. | 427/555 |
| 464270 | 1/1992 | European Pat. Off. | |
| 3326571 | 2/1984 | Germany | 219/121.68 |
| 215776 | 11/1984 | Germany | 427/555 |
| 3-146174 | 6/1991 | Japan | 427/556 |

*Primary Examiner*—Geoffrey S. Evans
*Attorney, Agent, or Firm*—W. C. Schubert; W. K. Denson-Low

[57] ABSTRACT

This invention pertains to a method and apparatus for inscribing a pattern into a surface of a substrate, such as a sheet of glass. The method includes the steps of providing a Nd:YAG laser (12) having a characteristic output wavelength of 1.06 micrometers; providing a glass substrate (18) that is substantially transparent to the characteristic output wavelength; and applying a layer of material, such as a layer of tape (16), to a surface (18a) of the substrate. The layer of material is selected so as to strongly absorb the characteristic output wavelength. A next step focuses (14) an output of the laser into a spot (12c) at or near to an interface between the layer of material and the surface of the substrate. A further step translates (20) the surface relative to the spot. The layer of material absorbs the output of the laser and is heated thereby to a temperature sufficient for inscribing the surface underlying the spot. That is, the layer of material enables the laser to build a plasma state adjacent to the surface of the substrate, which in turn scribes the surface of the substrate.

17 Claims, 1 Drawing Sheet

LASER SCRIBING ON GLASS USING ND:YAG LASER

FIELD OF THE INVENTION:

This invention relates generally to the inscription of an image w within a surface and, more particularly, to methods and apparatus that use laser energy for permanently marking or inscribing a pattern into a surface of a material.

BACKGROUND OF THE INVENTION:

Conventional techniques for inscribing an image into glass include mechanically abrading the surface of the glass with a pointed instrument, abrading the surface with a stream of particles (e.g., sand blasting), and chemically etching the surface. Each of these techniques has certain disadvantages and drawbacks, including a difficulty in accurately controlling the process, a requirement to perform an extensive cleanup of the workpiece, and the use of potentially harmful or toxic substances.

Laser energy has been recognized as a suitable means for inscribing an image into the surface of glass, as evidenced by U.S. Pat. No. 5,298,717 by DeRossett, Jr., entitled "Method and Apparatus for Laser Inscription of an Image on a Surface". In the approach of DeRossett, Jr. a $CO_2$ or an excimer laser is translated relative to a workpiece, such as the window of an automobile, so as to etch a desired pattern, such as a VIN number, bar code, or decorative design, into the window. $CO_2$ and excimer lasers are used because glass is opaque to their output wavelengths. When using the $CO_2$ laser the preferred power is between 10 watts and 20 watts, with powers below 10 watts said to be inadequate for etching a glass surface.

As can be appreciated, the technique of DeRossett, Jr. can be disadvantageous for some applications, as it requires that a laser be selected which is capable of outputting a beam to which the workpiece is opaque. The laser is also required to operate at significantly high power levels.

OBJECTS OF THE INVENTION:

It is a first object of this invention to provide an improved technique for inscribing an image into a transparent substrate that overcomes the foregoing and other problems.

It is a second object of this invention to provide a method and apparatus for inscribing an image into a transparent glass substrate with laser radiation, wherein the laser radiation may have an output wavelength that is not significantly absorbed by the glass substrate.

It is a further object of this invention to provide a method and apparatus for inscribing an image into a transparent glass substrate using a conventional Nd:YAG laser having an output wavelength of 1.06 micrometers.

SUMMARY OF THE INVENTION

The foregoing and other problems are overcome and the objects of the invention are realized by methods and apparatus for inscribing a pattern into a surface of a substrate with electromagnetic radiation, wherein the substrate may be substantially transparent or reflective to the radiation.

In one aspect of this invention there is provided a method for inscribing a pattern into a surface of a glass substrate. The method includes the steps of providing a Nd:YAG laser having a characteristic output wavelength of 1.06 micrometers; providing a glass substrate that is substantially transparent to the characteristic output wavelength; and applying a layer of material, such as tape, to a surface of the substrate. The layer of material is selected so as to strongly absorb the characteristic output wavelength. A next step focuses an output of the laser into a spot that is located preferably at or near an interface between the glass substrate and the layer of material. A further step translates the surface relative to the spot. The layer of material absorbs the output of the laser and is heated thereby to a temperature sufficient for inscribing the surface underlying the spot. That is, the layer of material enables the laser to build a plasma state adjacent to the surface of the substrate, which in turn scribes the surface of the substrate.

The teaching of this invention eliminates the restriction to limit workpieces to only those that are opaque to the laser wavelength. Also, the disadvantages observed when using mechanical abrasion and chemical etching are avoided. Furthermore, the Nd:YAG output power is shown to be significantly less than the 10 to 20 Watt output power required when using the above-described $CO_2$ laser to inscribe glass. In addition, the shorter wavelength of the Nd:YAG laser (1.06 micrometers) versus the wavelength of a $CO_2$ laser (10.6 micrometers) provides for scribing the substrate with a finer resolution.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
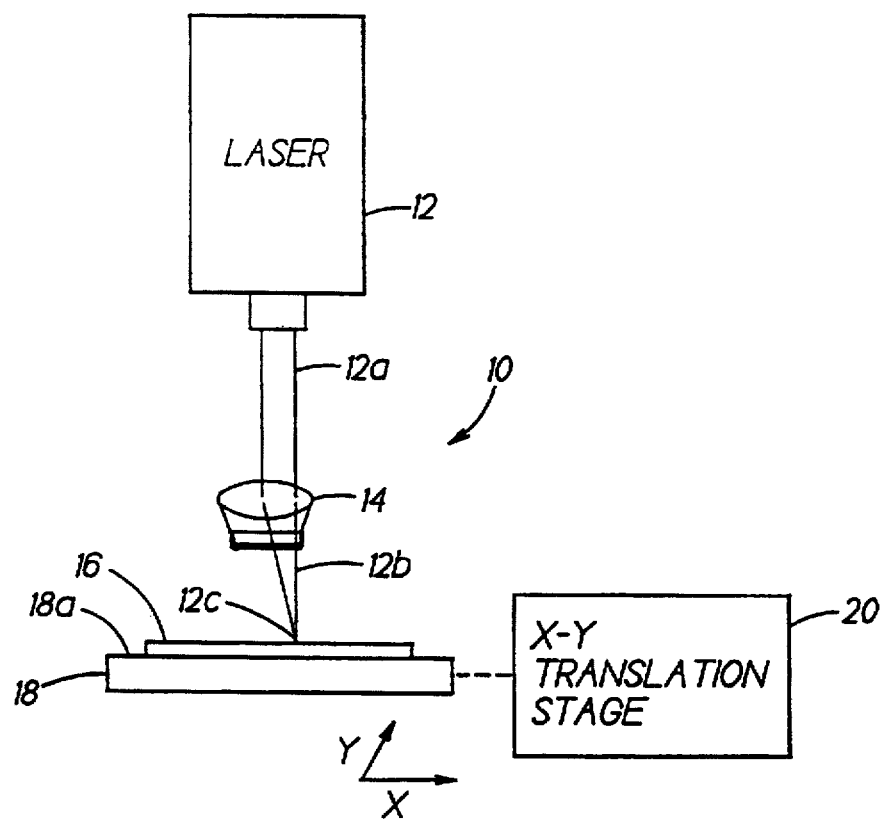
FIG. 1 is block diagram of a laser inscription system in accordance with this invention.
Figure 2:
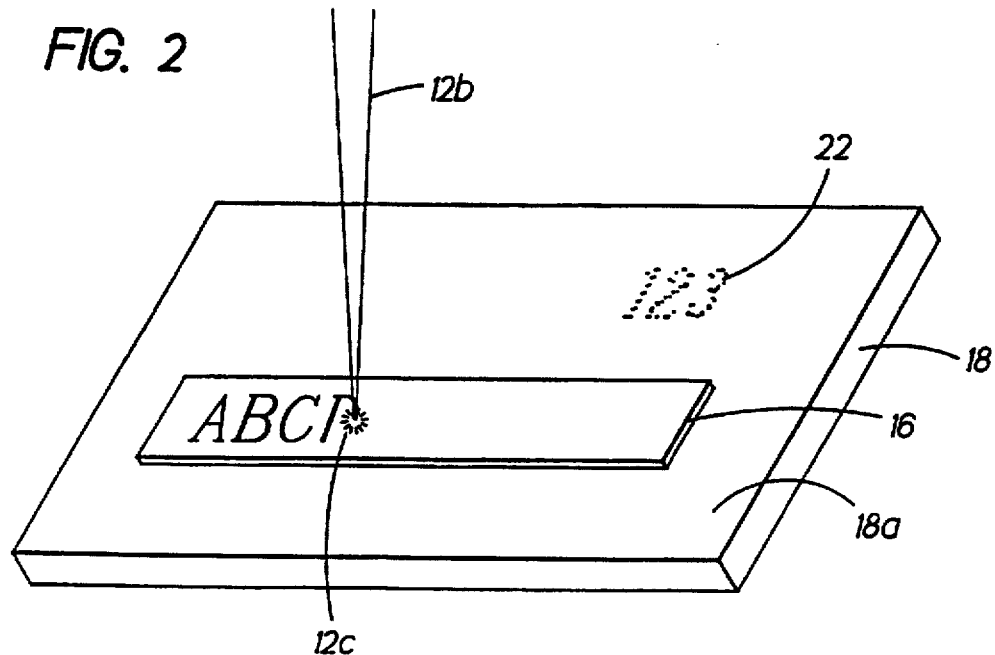
FIG. 2 is an elevational view of a glass substrate being laser inscribed in accordance with this invention.

Reference is made to FIGS. 1 and 2 for showing a presently preferred embodiment of a laser-based inscription system 10. A laser 12 delivers a collimated beam 12a to a focusing objective 14. The focusing objective 14 provides a focused beam 12b to a focal spot 12c. A workpiece 18 includes, in accordance with this invention, an overlying layer 16 of opaque material that strongly absorbs the wavelength output from the laser 12. That is, the layer 16 absorbs all or substantially all of the beam 12b. In a preferred embodiment of the invention the workpiece 18 is coupled to a multi-axis (x-y) translation stage 20. During operation the translation stage 20 controllably positions the workpiece 18 and overlying opaque material layer 16 relative to the focal spot 12c. The laser energy is absorbed within the material 16, which enables the laser energy to build a plasma state adjacent to surface 18a of the workpiece 18, which in turn scribes the surface 18a of the workpiece 18 as indicated by the characters 22 shown in FIG. 2. In a second, non-illustrated, embodiment of this invention the workpiece 18 is fixed in position and the laser 12 and/or the laser beam delivery system is moved relative to the surface 18a of the workpiece 18.

The focal spot 12c is preferably located at or adjacent to an interface between the surface 18a and the material 16. By example, the location of the focal spot 12c can be adjusted with a resolution of approximately 0.001 inch or less, and the focal spot 12c is set so as to be within, by example, a few thousandths of an inch of the interface between the surface 18a and layer of material 16.

In accordance with this invention the workpiece 18 may be substantially transparent to the wavelength output by the laser 12. By example, the workpiece 18 may be a sheet of window glass, and the laser 12 may be a Nd:YAG laser having an output wavelength of 1.06 micrometers. The layer 16 of opaque material can be embodied in a length of 0.002 inch thick amber colored Kapton™ tape that is available from 3M, part number 5413. The amber-colored tape is selected for strongly absorbing the 1.06 micrometer radiation output by the laser 12, and is ablated by same. The ablation of the tape results in the generation of a localized region of high temperature which is sufficient for scribing the surface 18a. In the absence of the tape the laser energy would pass substantially unabsorbed through the glass sheet, and a desired pattern would not be inscribed into the surface.

Another suitable tape is a bluish-colored reticle tape that was obtained from Nitto Semiconductor Equipment, number 18074-6, Roll Plastic Blue, Medium Tack. This tape is useful in that it leaves little residue on the substrate after removal. However, the above-described amber-colored tape was preferred for use in that the repeatability was found to be better.

The objective lens 14, in a preferred embodiment of the invention, is embodied in a 60 millimeter, three element apoachromat focusing objective that is available from the U.S. Laser Company, part no. 3440. The translation stage 20 is a computer controlled system that includes a character generator sub-system, and is available from Anarad as an Anomatic III system, model 2414.

EXAMPLE

A glass substrate was etched with a Nd:YAG laser 12 having a 1.06 micrometer, 2.3 Watt output with a 1.3 kilohertz pulse repetition frequency (PRF). The glass substrate was moved at 0.05 inch/second by the translation stage 20 during the etching process. The glass substrate had a layer of the above-described amber-colored tape applied to the surface into which a pattern was permanently etched. The tape was removed after the desired pattern was etched into the surface of the glass substrate.

It can be appreciated that the teaching of this invention overcomes the problems that are inherent in the prior art. For example, it is not necessary to limit the workpieces to only those that are opaque to the laser wavelength. Also, the disadvantages observed when using mechanical abrasion and chemical etching are avoided. Furthermore, the 2.3 Watt Nd:YAG output power is significantly less than the 10 to 20 Watt output power required when using a conventional $CO_2$ laser to inscribe glass, and the significantly shorter wavelength of the Nd:YAG laser provides superior resolution.

Although described in the context of a system for scribing glass, it should be further realized that a number of different materials can be laser inscribed in accordance with the invention. By example, the substrate may be comprised of sapphire. Also be example, the substrate can be a mirror, which would tend to reflect a significant portion of the laser light in the absence of the overlying layer of absorptive material. Further by example, the layer of absorptive material can be sprayed or painted on, and then subsequently removed after inscribing the desired pattern. The teaching of this invention is also not limited for use with an apoachromat focussing objective, in that a number of different optical lens types, and also reflector types, can be employed for providing a localized region of high intensity electromagnetic radiation at or near to the surface to be scribed.

Thus, while the invention has been particularly shown and described with respect to preferred embodiments thereof, it will be understood by those skilled in the art that changes in form and details may be made therein without departing from the scope and spirit of the invention.

What is claimed is:

1. A method for inscribing a pattern into a surface of a substrate, comprising the steps of:

providing a source of electromagnetic energy having a characteristic output wavelength;

providing the substrate;

adhesively applying a layer of material to a surface of the substrate, the layer of material being selected so as to strongly absorb the characteristic output wavelength;

positioning the substrate such that the layer of material is located between the surface and the source;

focussing an output of the source into a spot located at or near to an interface between the layer of material and the surface of the substrate;

translating the surface relative to the spot, wherein the layer of material absorbs the output of the source and is heated thereby to a temperature sufficient for inscribing the surface underlying the spot; and removing the adhesively applied layer of material.

2. A method as set forth in claim 1 wherein the step of providing a source of electromagnetic energy includes a step of providing an Nd:YAG laser, and wherein the characteristic wavelength is 1.06 micrometers.

3. A method as set forth in claim 1 wherein the step of focussing includes a step of applying a collimated output of the source to a focussing objective.

4. A method as set forth in claim 3 wherein the focussing objective is an apoachromat focussing objective.

5. A method as set forth in claim 1 wherein the substrate is substantially transparent to the characteristic wavelength.

6. A method as set forth in claim 1 wherein the substrate is substantially reflective to the characteristic wavelength.

7. A method as set forth in claim 1, wherein the steps of adhesively applying and removing apply and remove a layer of tape.

8. Apparatus for inscribing a pattern into a surface of a substrate, comprising:

a source of electromagnetic energy having a characteristic output wavelength;

means for focussing an output of the source to a localized region at or near to the surface of the substrate; and means for translating the substrate relative to the localized region, wherein the substrate has a layer of material that is adhesively applied to the surface, the layer of material being selected so as to strongly absorb the characteristic output wavelength such that the layer of material absorbs the output of the source and is heated thereby to a temperature sufficient for inscribing the surface underlying the localized region, the layer of material being located between the surface and the source.

9. Apparatus as set forth in claim 8 wherein the focussing means is comprised of an apoachromat focussing objective.

10. Apparatus as set forth in claim 8 wherein the substrate is substantially transparent to the characteristic wavelength.

11. Apparatus as set forth in claim 8 wherein the source of electromagnetic energy is comprised of an Nd:YAG laser, and wherein the characteristic wavelength is 1.06 micrometers.

12. Apparatus as set forth in claim 8, wherein the layer of material is comprised of tape.

13. Apparatus for inscribing a pattern into a surface of a substrate, comprising:

a source of electromagnetic energy having a characteristic output wavelength;

means for focussing an output of the source to a localized region at or near to the surface of the substrate; and means for translating the substrate relative to the localized region, wherein the substrate has a layer of material that is adhesively applied to the surface. the layer of material being selected so as to strongly absorb the characteristic output wavelength such that the layer of material absorbs the output of the source and is heated thereby to a temperature sufficient for inscribing the surface underlying the localized region, the layer of material being located between the surface and the source;

wherein the substrate is substantially reflective to the characteristic wavelength.

14. A method for inscribing a pattern into a surface of a glass substrate, comprising the steps of:

providing a Nd:YAG laser having a characteristic output wavelength of 1.06 micrometers;

providing a glass substrate that is substantially transparent to the characteristic output wavelength;

applying a layer of tape to a surface of the substrate, the layer of tape being selected so as to strongly absorb the characteristic output wavelength;

positioning the substrate such that the layer of tape is located between the surface and the laser;

focussing an output of the laser into a region that is at or near to an interface between the layer of tape and the surface of the substrate; and translating the surface relative to the spot, wherein the layer of tape absorbs the output of the laser such that the output of the laser builds a plasma state having a temperature sufficient for inscribing the surface underlying the spot.

15. A method as set forth in claim 14 wherein the laser output is collimated and is applied to a focussing objective.

16. A method as set forth in claim 15 wherein the focussing objective is an apoachromat focussing objective.

17. A method as set forth in claim 14, and further comprising a terminal step of removing the layer of tape.

* * * * *